UNITED STATES PATENT OFFICE 2,322,696

PROCESS FOR THE MANUFACTURE OF ACRYLIC ACID NITRILE DERIVATIVES

Peter Kurtz and Herbert Schwarz, Leverkusen-Wiesdorf, Germany; vested in the Alien Property Custodian No Drawing. Application February 12, 1941, Serial No. 378,566. In Germany October 17, 1939

10 Claims. (Cl. 260—464)

This invention relates to the preparation of acrylic acid nitrile derivatives of the formula $$R.CH=CH.C\equiv N$$

wherein R stands for an organic radical. The invention further pertains to the reaction involving the use of vinyl acetylene and hydrocyanic acid.

It has been disclosed in a copending application Ser. No. 343,269, filed June 29, 1940, that the reaction between acetylene and hydrocyanic acid under certain conditions yields acrylic acid nitrile. The process of the application mentioned above is based on the perception that catalysts for bringing about those addition reactions of acetylene which result in the formation of vinyl derivatives also effect the addition of hydrocyanic acid on acetylene. Briefly stated the process consists in bringing acetylene together with hydrocyanic acid into contact with an acid reacting solution of cuprous chloride as a catalyst.

Now we have found that the effectiveness of the catalyst used in the process of application Ser. No. 343,269 is not limited to the addition of hydrocyanic acid on acetylene but is also effective in adding hydrocyanic acid on substitution products of acetylene of the formula $$R-C\equiv CH$$

wherein R stands for an organic radical. Therefore our process consists in bringing substitution products of acetylene of the formula $$R-C\equiv CH$$

wherein R stands for an organic radical together with hydrocyanic acid into contact with these catalysts as are used in the process of application Ser. No. 343,269. As derivatives of acetylene of the formula $$R-C\equiv CH$$

there may be mentioned, for instance, vinylacetylene which yields 1-cyanbutadiene-1,3, when hydrocyanic acid is added thereto, according to the process of our invention.

As regards the catalyst it is to be pointed out that it may be composed in the same manner as stated in application Ser. No. 343,269. Thus, for instance, an aqueous acid reacting catalyst may be employed, prepared from cuprous chloride and a salt of the class consisting of ammonium, amine and alkali salts. It is advantageous to add to the catalyst copper powder in order to maintain the copper salt in the monovalent state as cupric copper may cause undesired side reactions. The acid reaction of the catalyst is attained by adding a strong acid such as hydrochloric acid, hydrobromic acid, sulfuric acid or phosphoric acid and it is preferable to adjust the pH to at least 6.

A suited catalyst may be composed from 1100 parts of cuprous chloride, 590 parts of ammonium chloride, 950 parts of water and 29 parts of concentrated hydrochloric acid. Equivalents may be used for the chemicals named and the proportions of the constituents may be varied.

The reaction may be carried out at temperatures between 0–200° C. but it is preferable to hold the temperature at about 60–80° C. when working under atmospheric pressure. Obviously, the reaction may be carried out in a continuous process.

The following example illustrates our invention without, however, restricting it thereto, the parts being by weight.

Example 1100 parts of cuprous chloride and 590 parts of ammonium chloride are allowed to run into 950 parts of water while adding 30 parts of copper powder and 29 parts of concentrated hydrochloric acid and heated to 80° C. with exclusion of air. The mixture is kept at this temperature for several hours. When cooled to room temperature 44 parts of vinylacetylene are added together with 40 parts of hydrocyanic acid, whereby the temperature of the mixture weakly rises. The mixture is stirred for 5 hours and then heated to 50° C. for 10 hours, and distilled off. The distillate consists of water and an oily layer which is separated from water, dried and distilled. 1-cyanbutadiene-1,3 is obtained in a good yield, which distills at 56–60° C. under a pressure of 44 mm.

We claim:

1. Process for the manufacture of acrylic acid nitrile derivatives of the formula $$R.CH=CH-C\equiv N$$

which comprises bringing derivatives of acetylene of the formula $$R.C\equiv CH$$

wherein R stands for a lower aliphatic hydrocarbon radical together with hydrocyanic acid into contact with a cuprous chloride catalyst.

2. Process for the manufacture of 1-cyanbutadiene-1,3 which comprises bringing vinylacetylene together with hydrocyanic acid into contact with a cuprous chloride catalyst.

3. Process for the manufacture of 1-cyanbutadiene-1,3 which comprises bringing vinylacetylene together with hydrocyanic acid into contact with an aqueous acid reacting solution of cuprous chloride as catalyst.

4. Process for the manufacture of 1-cyanbutadiene-1,3 which comprises bringing vinylacetylene together with hydrocyanic acid into contact with an aqueous acid reacting solution of cuprous chloride said solution containing also a salt of the class consisting of ammonium, amine and alkali metal salts.

5. Process for the manufacture of 1-cyanbutadiene-1,3 which comprises bringing vinylacetylene together with hydrocyanic acid into contact with an aqueous acid reacting solution of cuprous chloride said solution containing also copper powder and an ammonium salt.

6. Process for the manufacture of 1-cyanbutadiene-1,3 which comprises bringing vinylaceylene together with hydrocyanic acid into contact with an aqueous acid reacting solution prepared from cuprous chloride and a salt of the class consisting of ammonium, amine and alkali metal salts.

7. Process for the manufacture of 1-cyanbutadiene-1,3 which comprises bringing vinylacetylene together with hydrocyanic acid into contact with an aqueous acid reacting solution prepared from cuprous chloride and a salt of the class consisting of ammonium, amine and alkali metal salts said solution containing also copper powder.

8. Process for the manufacture of 1-cyanbutadiene-1,3 which comprises bringing vinylacetylene together with hydrocyanic acid into contact with an aqueous acid reacting solution prepared from cuprous chloride and ammonium chloride.

9. Process for the manufacture of 1-cyanbutadiene-1,3 which comprises bringing vinylacetylene together with hydrocyanic acid into contact with an aqueous acid reacting solution prepared from cuprous chloride and ammonium chloride said solution containing also copper powder.

10. A process for the manufacture of 1-cyanbutadiene-1,3 which comprises reacting vinyl acetylene with hydrocyanic acid in contact with an aqueous acid reacting solution prepared from 1100 parts of cuprous chloride, 590 parts of ammonium chloride, 950 parts of water, 30 parts of copper powder and 29 parts of concentrated hydrochloric acid at a temperature of approximately 80° C.

PETER KURTZ.
HERBERT SCHWARZ.